(12) United States Patent
Jubin et al.

(10) Patent No.: US 6,206,520 B1
(45) Date of Patent: Mar. 27, 2001

(54) CONTACT LENSES WITH CONTOURED EDGES

(75) Inventors: Philippe Jubin; Timothy Clutterbuck; Jeffery Roffman, all of Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/275,866

(22) Filed: Mar. 25, 1999

(51) Int. Cl.⁷ .................................................. G02C 7/04
(52) U.S. Cl. ......................... 351/160 R; 351/160 H; 351/177
(58) Field of Search ...................... 351/160 R, 160 H, 351/161, 162, 177

(56) References Cited

U.S. PATENT DOCUMENTS

| 5,452,031 | 9/1995 | Ducharme ........................... 351/177 |
| 5,815,236 | 9/1998 | Vayntraub ....................... 351/160 H |
| 5,975,694 | 11/1999 | Vayntraub ....................... 351/160 H |

FOREIGN PATENT DOCUMENTS

| 0 742 462 | 11/1996 | (EP) . |
| WO 97/34185 | 9/1997 | (WO) . |
| WO 98/00749 | 1/1998 | (WO) . |

*Primary Examiner*—Scott J. Sugarman
(74) *Attorney, Agent, or Firm*—Lois A. Gianneschi

(57) ABSTRACT

The invention provides contact lenses that have contoured lens edges that improve lens handling and comfort.

17 Claims, 3 Drawing Sheets

CONTACT LENSES WITH CONTOURED EDGES

FIELD OF THE INVENTION

The invention relates to contact lenses. In particular, the invention relates to contact lenses that have contoured edge designs that improve lens handling and comfort.

BACKGROUND OF THE INVENTION

The use of contact lenses for cosmetics and the correction of visual acuity is well known. Generally, the front, or convex, surface of a contact lens incorporates an optic zone, a lenticular zone, a bevel, and a side wall. The presence of all but the optic zone is necessitated by the need for the contact lens to fit comfortably, for the lens to position itself correctly on the wearer's eye, and for the lens to be easily handled by the lens wearer.

However, the use of the lenticular zone, bevel, and side wall is problematic. For example, the bevel forms a junction with the lenticular zone, which junction may act as a hinge point allowing the bevel to turn inwardly to, or outwardly from, the wearer's eye. Further, the junction may be sufficiently sharp so as to make the lens uncomfortable to wear. The side wall may also cause discomfort for the wearer. Therefore, a need exists for a lens that overcomes some or all of these disadvantages.

DETAILED DESCRIPTION OF THE INVENTION AND PREFERRED EMBODIMENTS

Figure 1:
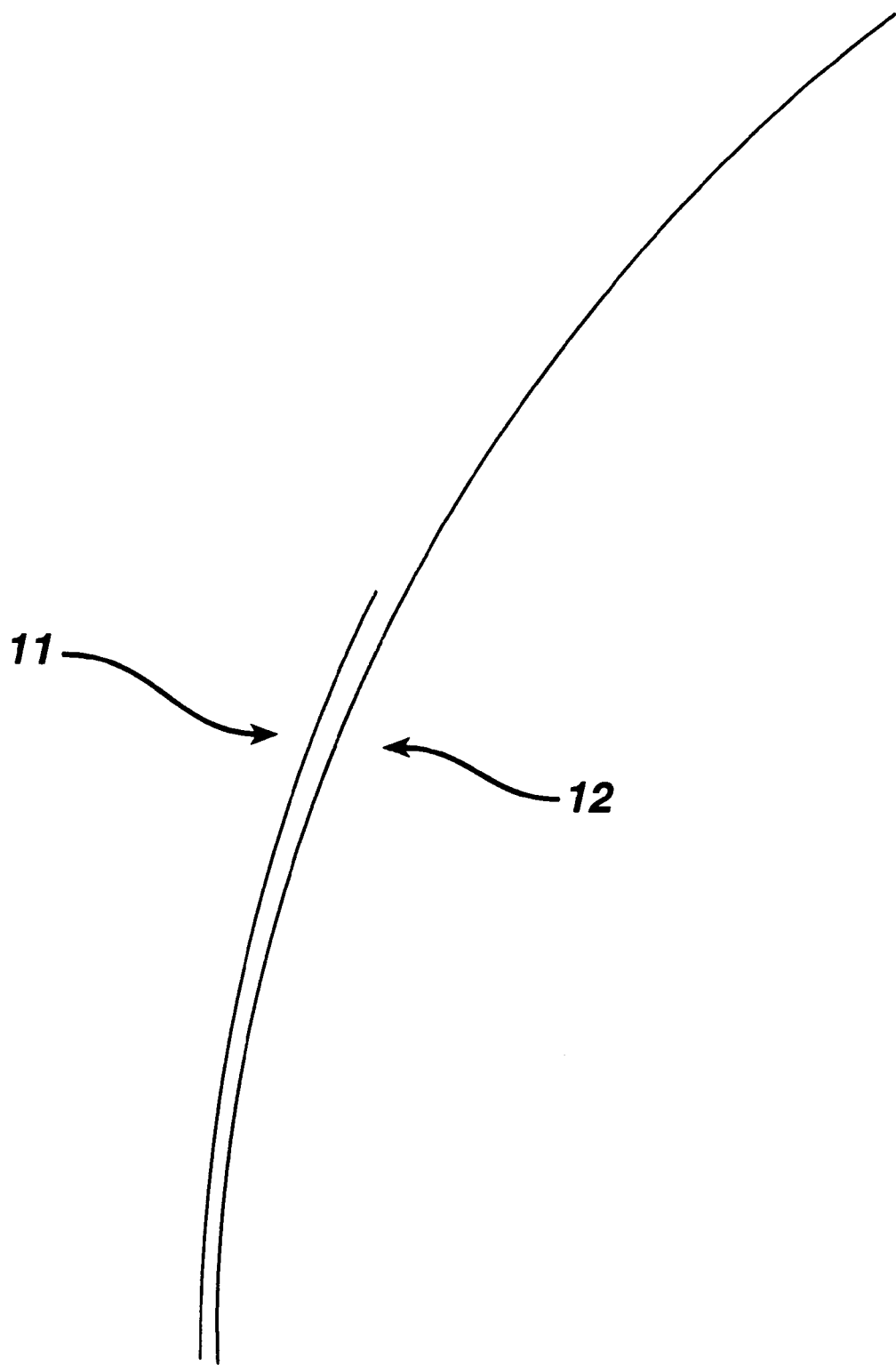
FIG. 1 is a magnified, partial cross-sectional view of a lens depicting a step in the process of the invention.

The invention provides contact lenses with contoured lens edges, and methods for producing the contact lenses. The contoured lens edges of the invention form a substantially smooth curve. By "lens edge" is meant the area beginning at the periphery of the optic zone and ending at the outermost point of the lens. The use of the contoured lens edge eliminates the need for one or more of a lenticular zone, bevel, side wall, or other zones found in a conventional contact lens to facilitate lens handling and orientation. Additionally, because the contoured edge forms a smooth junction with the optic zone of the lens, the lens is more comfortable to wear than conventional lenses. Finally, the contoured lens edge of the invention is advantageous because it provides greater bulk towards the lens' periphery than does a bevel, aiding in maintaining the lens' shape and orientation and facilitating lens handling.

In one embodiment, the invention provides a contact lens comprising, consisting essentially of, and consisting of a convex and a concave surface, one or both of the surfaces consisting essentially of an optic zone and a contoured lens edge. Preferably, the contoured lens edge of the invention is located on the convex surface of the lens. Thus, in another embodiment, the invention provides a contact lens comprising, consisting essentially of, and consisting of a convex and a concave surface, the convex surface consisting essentially of an optic zone and a contoured lens edge. In still another embodiment, the invention provides a method for designing a contact lens comprising, consisting essentially of, and consisting of a.) designing an optic zone for a first lens surface; b.) selecting an x and a y coordinate for each of at least two points on the first lens surface; and c.) fitting a curve through the points specified in step b.) to form a contoured lens edge, the contoured lens edge being a substantially smooth curve having a functional form selected from the group consisting of a polynomial, a ratio of two polynomials, a trigonometric function, a parametric function, a spline, a conic section, and combinations thereof.

Contact lenses useful in the invention may be either hard or soft lenses. Soft contact lenses, made of any material suitable for producing such lenses, preferably are used. The lenses of the invention may have any of a variety of corrective optical characteristics incorporated onto the surfaces. For example, the lens may have any one or more of spheric, aspheric, bifocal, multifocal, prismatic, or cylindric corrections. These corrections may be on either or both the convex or concave surface. For example, the lens of the invention may be a toric soft contact lens, meaning that the contact has a cylindrical optical surface, or power, to correct for the wearer's astigmatism.

In the method of the invention, the optic zone of the lens' is designed, or its radius, diameter, shape factor, and center thickness are determined, using any known method. Suitable methods include, without limitation, the use of commercially available design software. Typically, the optic zone is designed after the base curve for the opposite surface is determined. After determination of the base curve, the optic zone will be designed so that the combination of the base curve and optic zone provide the desired refractive correction for the lens.

Once optic zone designing is completed, the contoured lens edge is provided by first selecting points on the surface having the optic zone and then fitting a curve through the selected points. The x and y coordinates are specified for the selected points on the surface of the lens. It will be recognized by one ordinarily skilled in the art that at least two points must be specified for curve fitting purposes. One of the points must be located at the optic zone periphery and one at the outermost point of the lens. Additional points may be used and one ordinarily skilled in the art will recognize that the more points used, the more complex the shape of the contoured edge can be. However, lens production machinery and process limitations may limit the number of points that can be used.

A curve is then fitted through the selected points. The curve's functional form may be a polynomial, a ratio of two polynomials, trigonometric, parametric, a spline, a conic section, or a combination thereof. The specific function and point locations used preferably are selected so as to provide a substantially smooth curve and the desired local thickness. The curve fitting step may be achieved by any convenient method. For example, curve fitting may be carried out using known numerical interpolation methods. Alternatively, fitting may be accomplished using commercially available software.

Figure 2:
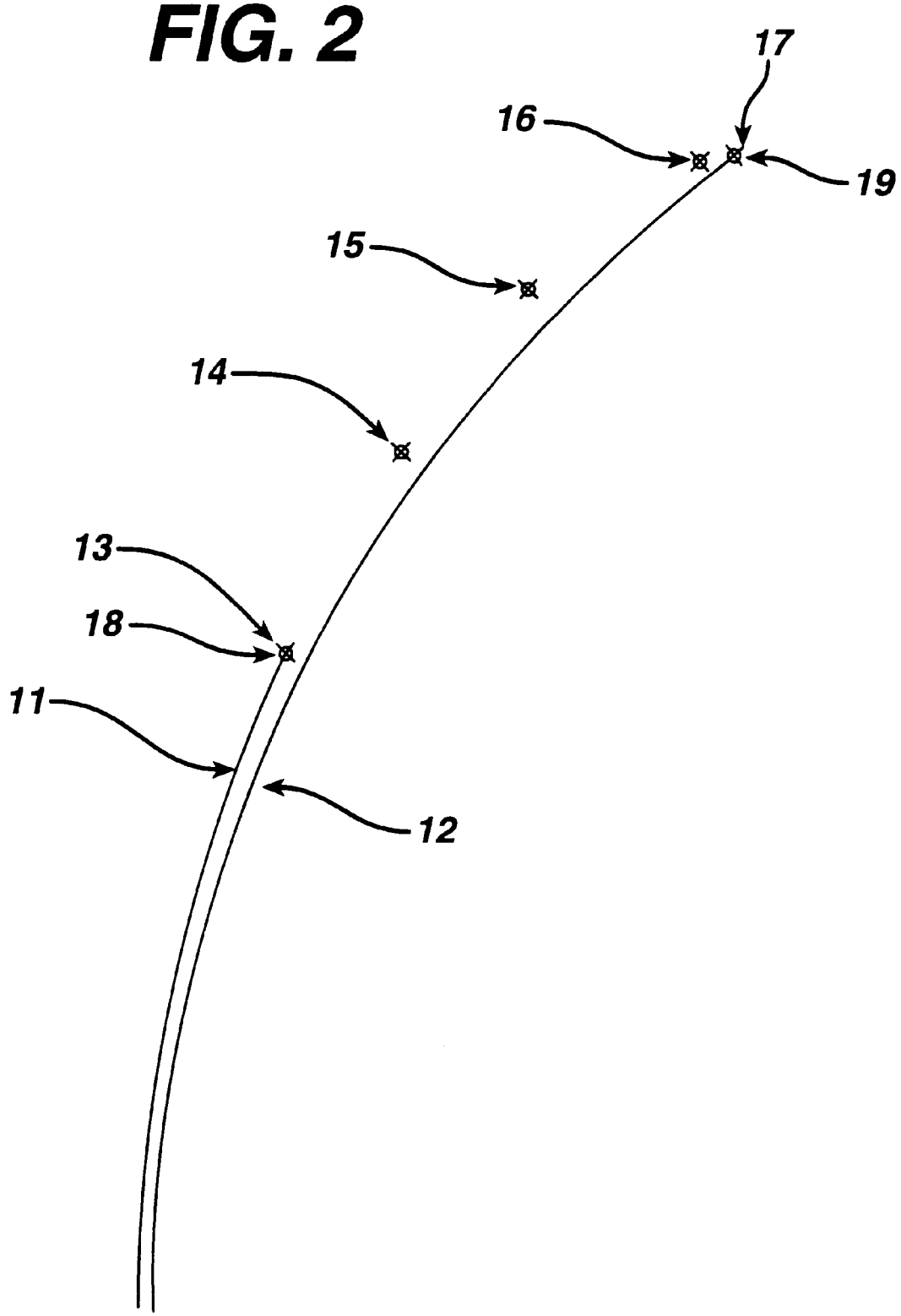
FIG. 2 is a magnified, partial cross-sectional view of a lens depicting another step in the process of the invention.
Figure 3:
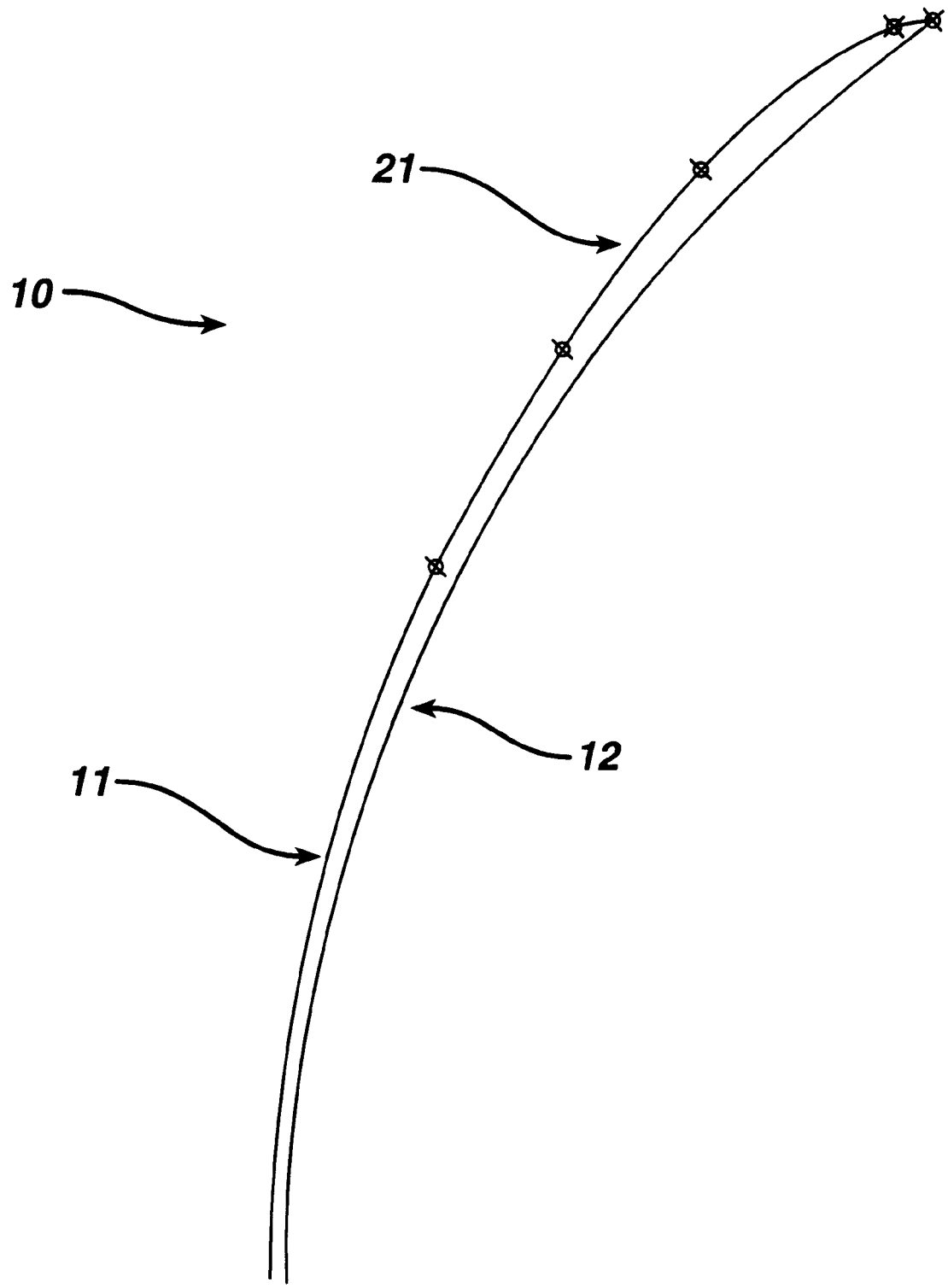
FIG. 3 is a magnified, partial cross-sectional view of a lens depicting another step in the process of the invention.

Referring to FIG. 1, a convex surface optic zone 11 is depicted, which optic zone is designed in relation to base curve 12. The x and y coordinates for points 13 through 17, shown in FIG. 2, are selected, points 13 and 17 corresponding to the optic zone periphery 18 and the lens' outermost point 19, respectively. A commercially available finite element analysis software may be used to select points 13 through 17 so that the lens thickness profile is optimized for handling and comfort. A curve of polynomial form is fitted through the points resulting in the substantially smooth contoured lens edge 21 of lens 10 shown in FIG. 3.

The lenses of the invention may be formed by any convenient means. For example, an optical cutting tool with a numerically controlled lathe may be used to form a metallic optical tool incorporating the contoured edge of the invention. The tool is then used to make convex surface molds that are then used, in conjunction with concave surface molds, to form the lens of the invention using a suitable liquid resin placed between the molds followed by compression and curing of the resin.

It will be understood by those of ordinary skill in the art that various other changes of the details of the invention described may be made. Such changes are intended to be included within the scope of the invention claimed.

What is claimed is:

1. A contact lens comprising a convex and a concave surface, one or both of the surfaces consisting essentially of an optic zone and a contoured lens edge, the contoured lens edge comprising a functional form selected from the group consisting of a ratio of two polynomials, a parametric function, a conic section, and combinations thereof.

2. The lens of claim 1, wherein the convex surface consists essentially of the optic zone and the contoured lens edge.

3. The lens of claim 1, wherein the lens is a soft contact lens.

4. The lens of claim 2, wherein the lens is a soft contact lens.

5. The lens of claim 1, wherein the functional form of the curve is a ratio of two polynomials.

6. The lens of claim 1, wherein the functional form of the curve is a parametric function.

7. The lens of claim 1, wherein the functional form of the curve is a conic section.

8. A method for designing a contact lens comprising the steps of:

a.) designing an optic zone for a first lens surface;

b.) selecting an x and a y coordinate for each of at least two points on the first lens surface; and c.) fitting a curve through the points specified in step b.) to form a contoured lens edge, the contoured lens edge being a substantially smooth curve comprising a functional form selected from the group consisting of a ratio of two polynomials, a parametric function, a conic section and combinations thereof.

9. The method of claim 8 wherein the first lens surface is the convex lens surface.

10. The method of claim 8, wherein one of the at least two points is at the periphery of the optic zone and one the at least two point is at an outermost point of the lens.

11. The method of claim 9, wherein one of the at least two points is at the periphery of the optic zone and one the at least two point is at an outermost point of the lens.

12. The method of claim 8, wherein the functional form of the curve is a ratio of two polynomials.

13. The method of claim 8, wherein the functional form of the curve is a parametric function.

14. The method of claim 8, wherein the functional form of the curve is a conic section.

15. The method of claim 11, wherein the functional form of the curve is a ratio of two polynomials.

16. The method of claim 11, wherein the functional form of the curve is a parametric function.

17. The method of claim 11, wherein the functional form of the curve is a conic section.

* * * * *